(12) United States Patent
Strong

(10) Patent No.: US 10,286,739 B1
(45) Date of Patent: May 14, 2019

(54) TIP ASSEMBLY FOR A TIRE PRESSURE GAUGE

(71) Applicant: HOPKINS MANUFACTURING CORPORATION, Emporia, KS (US)

(72) Inventor: Lynn Curtis Strong, Emporia, KS (US)

(73) Assignee: Hopkins Manufacturing Corporation, Emporia, KS (US)

( * ) Notice: Subject to any disclaimer, the term of this patent is extended or adjusted under 35 U.S.C. 154(b) by 155 days.

(21) Appl. No.: 15/633,298

(22) Filed: Jun. 26, 2017

Related U.S. Application Data

(60) Provisional application No. 62/354,500, filed on Jun. 24, 2016.

(51) Int. Cl.
*B60C 23/04* (2006.01)
*G01L 17/00* (2006.01)

(52) U.S. Cl.
CPC .......... *B60C 23/0496* (2013.01); *G01L 17/00* (2013.01); *B60C 23/0408* (2013.01); *B60C 23/0494* (2013.01)

(58) Field of Classification Search
CPC .. G01M 17/02; G01M 17/021; G01M 17/022; G01M 17/027; G01M 17/025; G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/04; G01M 3/40; G01M 5/0091; G01M 7/02; G01M 99/00; G01M 99/002; B60C 23/0494; B60C 23/04; B60C 23/0493; B60C 2019/004; B60C 19/00; B60C 23/0498; B60C 23/064; B60C 23/0488; B60C 23/0496; B60C 23/0408; B60C 23/041; B60C 23/0411; B60C 23/20; B60C 11/243; B60C 11/246; B60C 23/06; B60C 23/061; B60C 23/00; B60C 23/0486; B60C 11/0083; B60C 13/003; B60C 2009/2038; B60C 23/003; B60C 23/004; B60C 23/02; B60C 23/0401; B60C 23/0406; B60C 23/0416; B60C 23/0433; B60C 23/0455; B60C 23/0489; B60C 23/0491; B60C 25/002; B60C 25/005; B60C 25/007; B60C 29/02; B60C 3/04; B60C 99/00; B60C 99/006; B60C 11/24; B60C 13/001; B60C 13/02; B60C 15/0036; B60C 17/02; B60C 2009/0071; B60C 2009/2022; B60C 2200/02; B60C 2200/06; B60C 2200/065;

(Continued)

(56) References Cited

U.S. PATENT DOCUMENTS 4,827,764 A * 5/1989 Hwang ................... G01L 7/166
116/34 R
4,845,980 A * 7/1989 Weng ..................... G01L 17/00
73/146.8

(Continued)

*Primary Examiner* — Andre J Allen
(74) *Attorney, Agent, or Firm* — Hovey Williams LLP

(57) ABSTRACT

A pressure gauge broadly comprising a conduit, a pressure indicator, and a tip assembly. The tip assembly extends from the distal end of the conduit and includes an inner shaft, an annular seat, and an outer tip. The inner shaft engages a valve stem core of a valve. The annular seat cradles and provides support to the outer tip. The outer tip forms a seal against a valve stem tube of the valve and has an outer surface having a semi-spherical, dome, or frusto-conical shape for ensuring that the seal is formed regardless of the angle at which the tip engages the valve.

20 Claims, 2 Drawing Sheets

Figure 1:
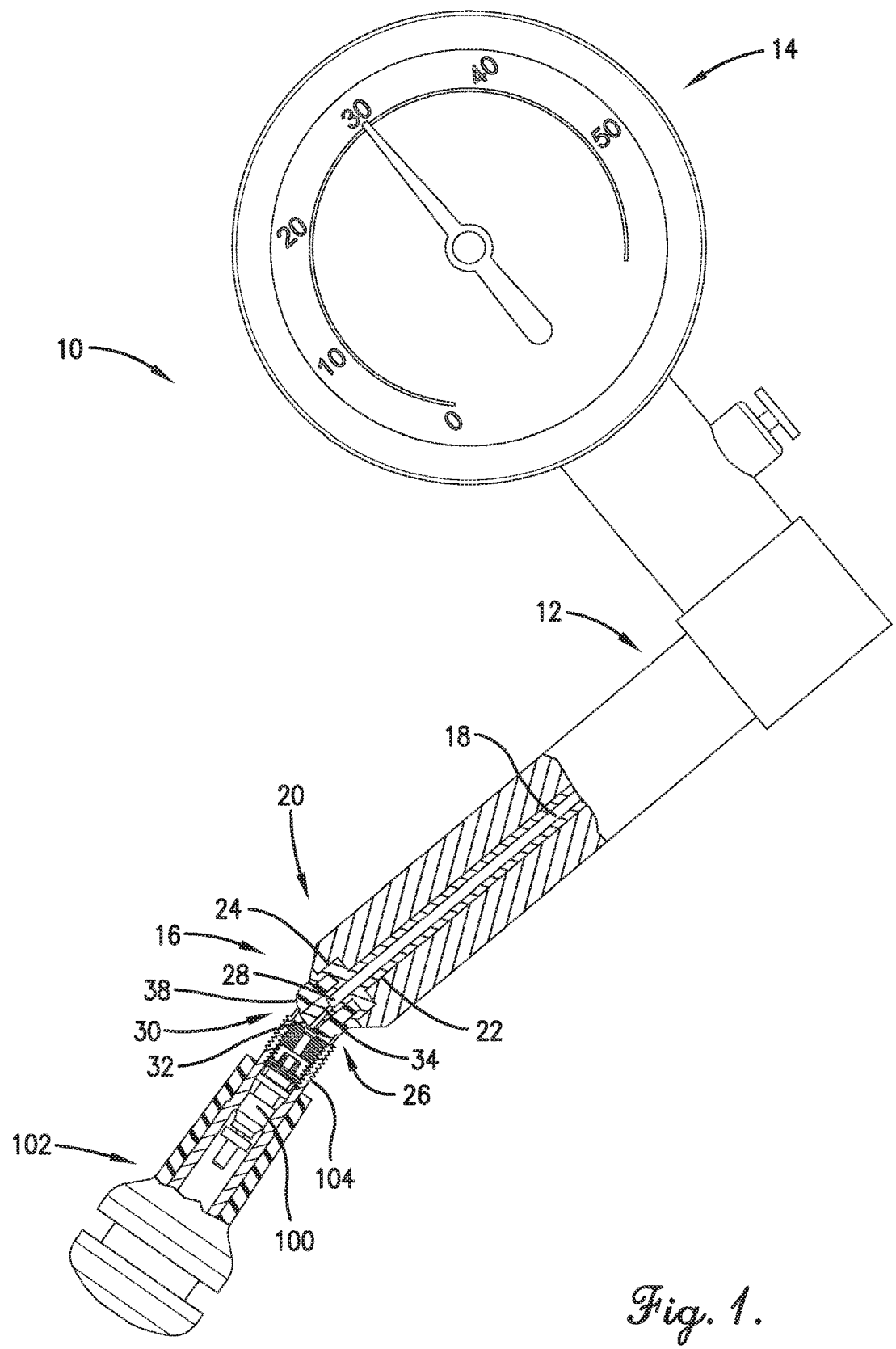

(58) Field of Classification Search
CPC ... B60C 23/001; B60C 23/007; B60C 23/008; B60C 23/0413; B60C 23/0427; B60C 23/0447; B60C 23/0454; B60C 23/0459; B60C 23/0467; B60C 23/0471; B60C 23/0472; B60C 23/0474; B60C 23/0476; B60C 23/0484; B60C 23/065; B60C 23/066; B60C 23/10; B60C 25/0548; B60C 25/056; B60C 25/132; B60C 25/138; B60C 25/18; B60C 29/005; B60C 9/005; B60C 9/18; B60C 9/1807; B60C 9/20; B60C 9/28
USPC .................................................. 73/146–146.8
See application file for complete search history.

(56) References Cited

U.S. PATENT DOCUMENTS

| | | | |
|---|---|---|---|
| 6,722,193 B1* | 4/2004 | Conway | G01L 17/00 73/146 |
| 2002/0005066 A1* | 1/2002 | Tanner | G01L 17/00 73/146 |
| 2005/0241381 A1* | 11/2005 | Bosler | G01L 17/00 73/146 |
| 2007/0095133 A1* | 5/2007 | Wrubel | G01L 17/00 73/146 |
| 2007/0113666 A1* | 5/2007 | Rutherford | B60C 23/0496 73/732 |
| 2007/0193348 A1* | 8/2007 | Rutherford | B60C 23/0408 73/146.8 |
| 2007/0209432 A1* | 9/2007 | Rutherford | B60C 23/0496 73/146.8 |
| 2017/0267038 A1* | 9/2017 | Li | B60C 23/0494 |

\* cited by examiner

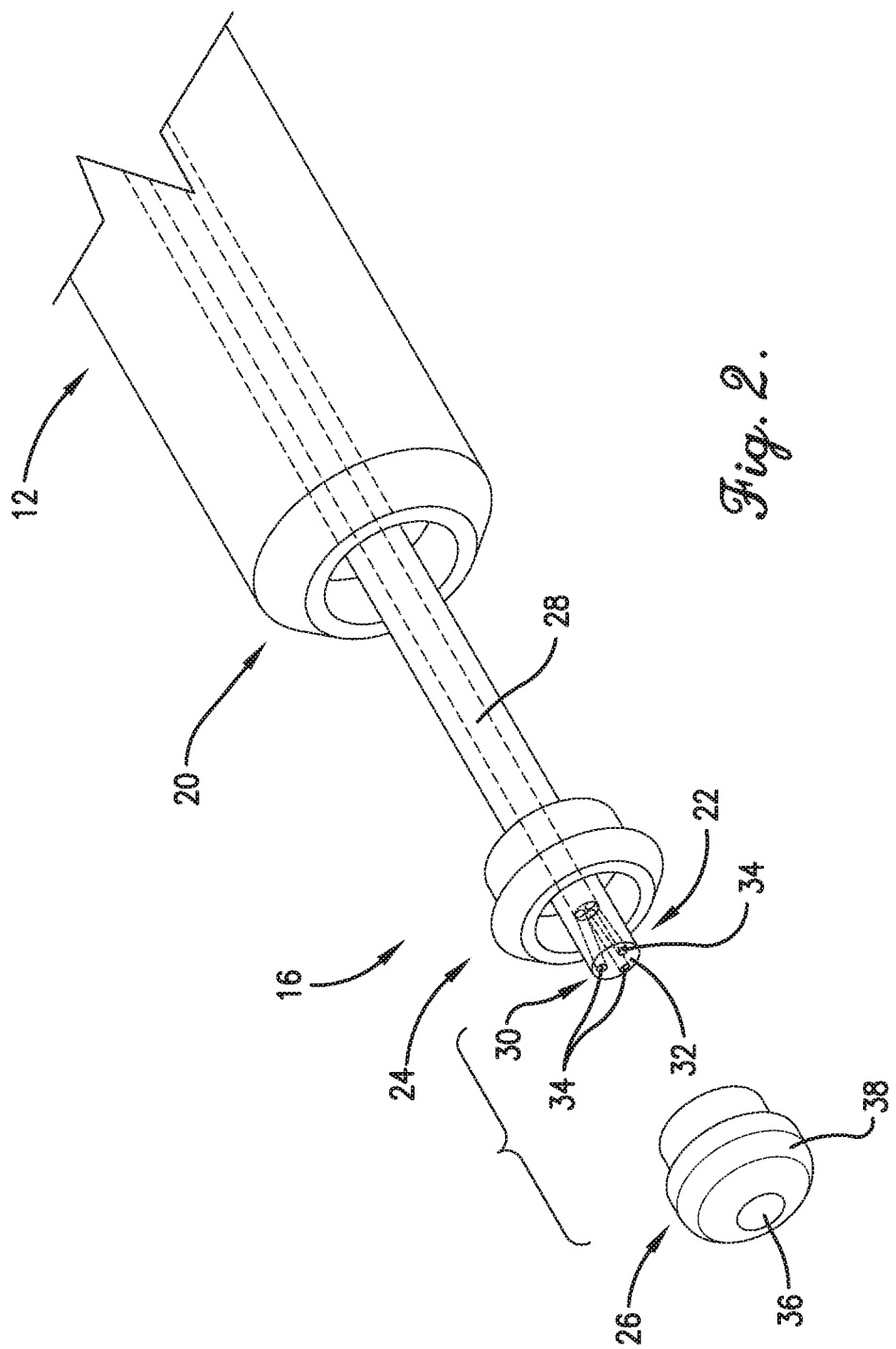

TIP ASSEMBLY FOR A TIRE PRESSURE GAUGE

RELATED APPLICATIONS

The present invention is a regular utility non-provisional patent application and claims priority benefit of U.S. Provisional Patent Application Ser. No. 62/354,500, filed Jun. 24, 2016, and entitled TIP FOR A TIRE PRESSURE GAUGE. The above-identified provisional patent application is hereby incorporated by reference in its entirety into the present application.

BACKGROUND

Pressure gauges are often used for determining internal pressure of tires, inflatable bladders, tanks, canisters, and other pressurized containers. The tips of conventional pressure gauges include a cylindrical cup and a center post. The cylindrical cup is configured to be placed over and pressed against the end of a valve stem tube of a valve to form an airtight seal between the pressure gauge and the valve. The center post is configured to depress a valve stem core of the valve to release pressurized air or gas into the pressure gauge.

If the cylindrical cup and the valve stem tube are not perfectly aligned, some of the released air or gas escapes. This causes a significant pressure drop as the remainder of the released air enters the pressure gauge and thus results in inaccurate pressure readings. Furthermore, the center post may not fully depress the valve stem core if the pressure gauge is not aligned with the valve. A reduced amount of air or gas is released, which further contributes to inaccurate pressure readings. The center post may also impart a side force onto the valve stem core if misaligned, which may damage the valve stem core and may prevent the valve from fully closing.

Another challenge with conventional pressure gauges is that the cylindrical cup is configured to overlap the valve stem tube, which makes it difficult to visually determine whether a proper seal has been formed. Users also cannot tell whether an initial seal has been broken and thus may erroneously assume the initial seal remains for the duration of the pressure test.

SUMMARY

Embodiments of the invention solve the above-mentioned problems and provide a distinct advance in pressure gauges. More particularly, the invention provides a pressure gauge that more easily forms and retains a seal with a valve and does not damage the valve stem core. These and other advantages of the invention will be described in more detail below.

A pressure gauge constructed in accordance with an embodiment of the invention broadly comprises a conduit, a pressure indicator, and a tip assembly. The conduit is hollow and includes an inner channel connecting distal and proximal open ends. The distal end connects to the tip assembly and may include a connector, hose clamp, or other feature for ensuring an airtight seal between the conduit and the tip assembly. The proximal end connects to the pressure indicator and may include a connector, hose clamp, or other feature for ensuring an airtight seal between the conduit and the pressure indicator. The inner channel allows pressurized air to flow from the tip assembly to the pressure indicator. The conduit may be a flexible tube or a rigid member such as an elongated rubber hose or a handheld metal or plastic rod, nozzle, or handle.

The pressure indicator displays internal pressures and may be a rotating needle display, a pencil gauge shaft, an electronic display, or any other suitable pressure indicator. The pressure indicator may be integrated with the conduit, attached or connected to the conduit via a valve or connector, in slide-able engagement with the conduit in the case of a pencil gauge shaft, or integrated with an air compressor to which the pressure gauge is attached.

The tip assembly extends from the distal end of the conduit and includes an inner shaft, an annular seat, and an outer tip. The inner shaft is configured to engage the valve stem core of the valve and includes an open-ended central channel and a distal end having an outer surface. The open-ended central channel allows pressurized air to pass into the inner channel of the conduit and may include a plurality of openings spaced from each other at the inner shaft's distal end. The openings may also be offset from a central axis such that at least one of the openings is unobstructed when the tip engages the valve stem core. The outer surface of the distal end may be convex for improving engagement between the inner shaft and the valve stem core at various engagement angles. The inner shaft may also have geometry such as a helical thread or hose barb for retaining the outer tip thereon. The inner shaft may be formed of brass or any other suitable metal or rigid material.

The annular seat encircles the inner shaft and cradles the outer tip. The annular seat may be a lip, flange, rim, or other suitable structure and may have geometry such as a helical thread or hose barb for retaining the outer tip on the inner shaft. The annular seat may be formed of brass or any other suitable metal or rigid material.

The outer tip forms a seal against a valve stem tube of the valve and has a central aperture and an outer surface. The central aperture receives the end of the inner shaft therein. The outer surface has a semi-spherical, dome (e.g., convex), or frusto-conical shape for ensuring that the seal is formed regardless of the angle at which the tip engages the valve. The outer tip may be formed of rubber, PVC, or any other suitable compressible airtight material.

In use, the tip assembly is positioned against the valve such that the outer tip contacts and forms a seal against the valve stem tube. Importantly, the semi-spherical, dome, or frusto-conical shape of the outer surface of the outer tip allows the tip assembly to be axially aligned with the valve or angled up to at least 15 degrees from axial alignment in any radial direction and rotational orientation relative to the valve. The outer surface of the outer tip also laterally centers the tip assembly onto the valve as the tip assembly is positioned against the valve. Thus, a user does not need to laterally, radially, or rotationally align the pressure gauge with the valve.

The pressure gauge may then be pressed against the valve such that the inner shaft of the tip assembly engages and depresses the valve stem core of the valve. The convex outer surface of the inner shaft allows the inner shaft to impart an axial force on the valve stem core without imparting a significant lateral force to the valve stem core. The valve stem tube may compress the outer tip as the pressure gauge is pressed against the valve. The outer tip retains the seal formed between the outer tip and the valve stem tube as it is compressed.

The valve stem core then causes the valve to release pressurized air as it is depressed. The pressurized air then passes into the open-ended central channel of the inner shaft via at least one of the openings in the outer surface of the inner shaft. Note that some of the openings may be at least partially obstructed by the valve stem core. However, at least one of the openings will be unobstructed since the openings are spaced from each other and optionally axially offset.

The outer tip prevents the pressurized air from escaping the passageway formed from the valve stem tube to the conduit regardless of the angle (up to at least 15 degrees) and rotational orientation of the tip assembly relative to the valve. Thus, the pressurized air continues into the inner channel of the conduit to the pressure indicator and causes the pressure indicator to indicate an accurate pressure level of the pressurized air.

The above-described pressure gauge provides several advantages over conventional pressure gauges. For example, the semi-spherical, dome, or frusto-conical shape of the outer surface allows the tip assembly to be axially aligned with the valve or angled up to at least 15 degrees from axial alignment in any radial direction and rotational orientation relative to the valve. The outer tip's outer surface also laterally centers the tip assembly onto the valve as the tip assembly is positioned against the valve. Thus, a user does not need to laterally, radially, or rotationally align the pressure gauge with the valve. The pressure gauge can also be rotated relative to the valve or leveraged towards or away from axial alignment with the valve without leaking pressurized air. Moreover, the convex shape of the outer surface of the inner shaft allows the inner shaft to keep the valve stem core depressed a relatively even amount and one or more of the openings become unobstructed if another one of the openings becomes obstructed by the valve stem core if the pressure gauge is rotated or leveraged towards or away from axial alignment relative to the valve. Thus, the user does not need to hold the pressure gauge perfectly steady while obtaining a pressure reading.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 1 is a partial cutaway elevation view of a pressure gauge constructed in accordance with an embodiment of the invention and shown engaging a valve; and FIG. 2 is an exploded perspective view of the pressure gauge of FIG. 1.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Turning to the drawing figures, a pressure gauge 10 constructed in accordance with an embodiment of the invention is illustrated. The pressure gauge 10 broadly comprises a conduit 12, a pressure indicator 14, and a tip assembly 16. The pressure gauge 10 may be portable or part of a larger device such as a manual or motorized air compressor. For example, the conduit 12 may be an elongated hose connected to an air compressor or pressurized canister for filling a tire, inflatable bladder, tank, canister, or other object with pressurized air.

The conduit 12 is hollow and includes an inner channel 18 connecting an open distal end 20 and an opposing open proximal end. The distal end 20 connects to the tip assembly 16 and may include a connector, hose clamp, or other feature for ensuring an airtight seal between the conduit 12 and the tip assembly 16. The proximal end connects to the pressure indicator 14 and may include a connector, hose clamp, or other feature for ensuring an airtight seal between the conduit 12 and the pressure indicator 14. The inner channel 18 allows pressurized air to flow from the tip assembly 16 to the pressure indicator 14. The conduit 12 may be a flexible tube or a rigid member. For example, the conduit 12 may be an elongated rubber hose or a handheld metal or plastic rod, nozzle, or handle.

The pressure indicator 14 displays an air pressure of a tire or other pressurized container and may be a rotating needle display, a pencil gauge shaft, an electronic display, or any other suitable pressure indicator. The pressure indicator 14 may be integrated with the conduit 12, attached or connected to the conduit 12 via a valve or connector, or in slide-able engagement with the conduit 12 in the case of a pencil gauge shaft.

The tip assembly 16 extends from the distal end 20 of the conduit 12 and includes an inner shaft 22, an annular seat 24, and an outer tip 26. It will be understood that the tip assembly 16 may be integral with the conduit 12 or connected thereto. The inner shaft 22 is configured to engage a valve stem core 100 of a valve 102 and includes an open-ended central channel 28 and a distal end 30 having an outer surface 32. The open-ended central channel 28 allows pressured air to pass into the inner channel 18 of the conduit 12 and may include a plurality of openings 34 spaced from each other at the inner shaft's distal end 30. The openings 34 may also be offset from a central axis such that at least one of the openings 34 is unobstructed when the tip assembly 16 engages the valve stem core 100. The outer surface 32 of the distal end 20 may be convex for improving engagement between the inner shaft 22 and the valve stem core 100 at various engagement angles as explained in more detail below. The inner shaft 22 may also have geometry such as a helical thread or hose barb for retaining the outer tip 26 on the inner shaft 22. The inner shaft 22 may be formed of brass or any other suitable metal or rigid material.

The annular seat 24 encircles the inner shaft 22 and cradles the outer tip 26. The annular seat 24 may be a lip, flange, rim, or other suitable structure and may have geometry such as a helical thread or hose barb for retaining the outer tip 26 on the inner shaft 22. The annular seat 24 may be formed of brass or any other suitable metal or rigid material.

The outer tip 26 forms a seal against a valve stem tube 104 of the valve 102 and has a central aperture 36 and an outer surface 38. The central aperture 36 receives the inner shaft 22 therein. The outer surface 38 has a semi-spherical, dome (e.g., convex), or frusto-conical shape for ensuring that the seal is formed regardless of the angle at which the tip assembly 16 engages the valve 102. The outer tip 26 may be formed of rubber, PVC, or any other suitable compressible airtight material.

Use of the above-described pressure gauge 10 will now be described in more detail. First, the tip assembly 16 of the pressure gauge 10 is positioned against the valve 102 such that the outer tip 26 contacts and forms a seal against the valve stem tube 104. Importantly, the semi-spherical, dome, or frusto-conical shape of the outer surface 38 of the outer tip 26 allows the tip assembly 16 to be axially aligned with the valve 102 or angled up to at least 15 degrees from axial alignment in any radial direction and rotational orientation relative to the valve 102. The outer surface 38 of the outer tip 26 also laterally centers the tip assembly 16 onto the valve 102 as the tip assembly 16 is positioned against the valve 102. Thus, a user does not need to laterally, radially, or rotationally align the pressure gauge 10 with the valve 102.

The pressure gauge 10 may then be pressed against the valve 102 such that the inner shaft 22 of the tip assembly 16 engages and depresses the valve stem core 100 of the valve 102. The convex outer surface 32 of the inner shaft 22 allows the inner shaft 22 to impart an axial force on the valve stem core 100 without imparting a significant lateral force to the valve stem core 100. The valve stem tube 104 may compress the outer tip 26 as the pressure gauge 10 is pressed against the valve 102. The outer tip 26 retains the seal formed between the outer tip 26 and the valve stem tube 104 as it is compressed.

The valve stem core 100 then causes the valve 100 to release pressurized air as it is depressed. The pressurized air then passes into the open-ended central channel 28 of the inner shaft 22 via at least one of the openings 34 in the outer surface 38 of the inner shaft 22. Note that some of the openings 34 may be at least partially obstructed by the valve stem core 100. However, at least one of the openings 34 will be unobstructed since the openings 34 are spaced from each other and optionally axially offset.

The outer tip 26 prevents the pressurized air from escaping the passageway formed from the valve stem tube 104 to the conduit 12 regardless of the angle and rotational orientation of the tip assembly 16 relative to the valve 102. Thus, the pressurized air continues into the inner channel 18 of the conduit 12 to the pressure indicator 14 and causes the pressure indicator 14 to indicate an accurate pressure level of the pressurized air.

Of equal importance, the pressure gauge 10 can be rotated relative to the valve 102 or leveraged towards or away from axial alignment with the valve 102 without leaking pressurized air. This is because the semi-spherical, dome, or frusto-conical shape of the outer surface 38 allows the outer tip 26 to retain the seal with the tip assembly 16 being in any rotational orientation and angle from axial alignment up to at least 15 degrees relative to the valve 102. Moreover, the convex shape of the outer surface 32 of the inner shaft 22 allows the inner shaft 22 to keep the valve stem core 100 depressed a relatively even amount and one or more of the openings 34 become unobstructed if another one of the openings 34 becomes obstructed by the valve stem core 100 if the pressure gauge 10 is rotated or leveraged towards or away from axial alignment relative to the valve 102. Thus, the user does not need to hold the pressure gauge 10 perfectly steady while obtaining a pressure reading.

The above-described pressure gauge 10 proves several advantages over conventional pressure gauges. For example, the semi-spherical, dome, or frusto-conical shape of the outer surface 38 allows the tip assembly 16 to be axially aligned with the valve 102 or angled up to at least 15 degrees from axial alignment in any radial direction and rotational orientation relative to the valve 102. The outer surface 38 also laterally centers the tip assembly 16 onto the valve 102 as the tip assembly 16 is positioned against the valve 102. Thus, a user does not need to laterally, radially, or rotationally align the pressure gauge 10 with the valve 102. The pressure gauge 10 can also be rotated relative to the valve 102 or leveraged towards or away from axial alignment with the valve 102 without leaking pressurized air. Moreover, the convex shape of the outer surface 32 of the inner shaft 22 allows the inner shaft 22 to keep the valve stem core 100 depressed a relatively even amount and one or more of the openings 34 become unobstructed if another one of the openings 34 becomes obstructed by the valve stem core 100 if the pressure gauge 10 is rotated or leveraged towards or away from axial alignment relative to the valve 102. Thus, the user does not need to hold the pressure gauge 10 perfectly steady while obtaining a pressure reading. The outer tip 26 also does not obscure the valve stem tube 104 so that the user can visually ensure that a seal is being formed and maintained.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A tire pressure gauge tip assembly comprising:
    an inner shaft having an open-ended channel extending therethrough; and
    an outer tip extending around the inner shaft, the outer tip having an outer surface being configured to form a seal against a valve stem tube of a tire valve and the inner shaft being configured to engage a valve stem core of the tire valve at one of a plurality of engagement angles from axial alignment with the tire valve so as to obtain an accurate tire pressure regardless of the engagement angle.

2. The tire pressure gauge tip assembly of claim 1, wherein the outer tip is configured to form the seal and the inner shaft is configured to engage the valve stem core at engagement angles of between 0 degrees and 15 degrees from axial alignment with the tire valve.

3. The tire pressure gauge tip assembly of claim 2; wherein the pressure gauge tip assembly is configured to be tilted from axial alignment with the valve in one of a plurality of radial directions when the pressure gauge tip assembly engages the tire valve.

4. The tire pressure gauge tip assembly of claim 3, wherein the plurality of radial directions includes all radial directions.

5. The tire pressure gauge tip assembly of claim 4, wherein the open-ended channel includes a plurality of openings for ensuring that at least one of the plurality of openings is not blocked by the valve stem core regardless of the engagement angle and radial direction in which the pressure gauge tip assembly is tilted.

6. The tire pressure gauge tip assembly of claim 4, wherein the outer surface of the outer tip has a convex shape for creating a uniform seal regardless of the engagement angle and radial direction in which the pressure gauge tip assembly is tilted.

7. The tire pressure gauge tip assembly of claim 1, wherein the inner shaft has a distal end and the outer tip extends to the distal end of the inner shaft.

8. The tire pressure gauge tip assembly of claim 1, wherein the inner shaft has a distal end having a convex surface for engaging the valve stem core face-on at the one of the plurality of engagement angles.

9. The tire pressure gauge tip assembly of claim 1, further comprising an annular seat configured to extend around at least a portion of the outer tip.

10. The tire pressure gauge tip assembly of claim 1, wherein the inner shaft is formed of a rigid material.

11. The tire pressure gauge tip assembly of claim 10, wherein the inner shaft is formed of brass.

12. The tire pressure gauge tip assembly of claim 1, wherein the outer tip is formed of a compressible material.

13. The tire pressure gauge tip assembly of claim 12, wherein the outer tip is formed of PVC or rubber.

14. A tire pressure gauge comprising:
 a conduit configured to receive pressurized air therethrough, the conduit having opposing open proximal and distal ends; and
 a tip assembly near the distal end of the conduit, the tip assembly including
  an inner shaft having an open-ended channel extending therethrough to the conduit; and
  an outer tip extending around the inner shaft, the outer tip having an outer surface being configured to form a seal against a valve stem tube of a tire valve and the inner shaft being configured to engage a valve stem core of the tire valve at one of a plurality of engagement angles from axial alignment with the tire valve so as to obtain an accurate tire pressure regardless of the engagement angle.

15. The tire pressure gauge of claim 14, wherein the outer tip is configured to form the seal and the inner shaft is configured to engage the valve stem core at engagement angles of between 0 degrees and 15 degrees from axial alignment with the tire valve.

16. The tire pressure gauge of claim 15; wherein the tip assembly is configured to be tilted from axial alignment with the valve in one of a plurality of radial directions when the tip assembly engages the tire valve.

17. The tire pressure gauge of claim 16, wherein the plurality of radial directions includes all radial directions.

18. The tire pressure gauge of claim 17, wherein the open-ended channel includes a plurality of openings for ensuring that at least one of the plurality of openings is not blocked by the valve stem core regardless of the engagement angle and radial direction in which the tip assembly is tilted.

19. The tire pressure gauge of claim 17, wherein the outer surface of the outer tip has a convex shape for creating a uniform seal regardless of the engagement angle and radial direction in which the tip assembly is tilted.

20. A tire pressure gauge comprising:
 a conduit configured to receive pressurized air therethrough, the conduit having opposing open distal and proximal ends;
 a pressure indicator connected to the proximal end of the conduit for indicating a tire pressure; and
 a tip assembly near the distal end of the conduit, the tip assembly including
  an inner shaft including a distal end having a convex surface and an open-ended channel extending through the inner shaft to the conduit, the open-ended channel including a plurality of openings at the distal end of the inner shaft; and
  an outer tip extending around the inner shaft, the outer tip having a convex shape for forming a seal against a valve stem tube of a tire valve, the inner shaft being configured to engage a valve stem core of the tire valve at one of a plurality of engagement angles between 0 degrees and 15 degrees from axial alignment with the tire valve in one of a plurality of radial directions so as to obtain an accurate tire pressure, the open-ended channel being configured to receive pressurized air through at least one of the plurality of openings regardless of the engagement angle and radial direction.

* * * * *